Patented May 18, 1954

2,678,900

UNITED STATES PATENT OFFICE 2,678,900

VITAMIN $B_{12}$ EXTRACTION PROCESS

Robert G. Denkewalter, Westfield, Robert S. Malcolmson, Cranford, and George B. Hughey, Metuchen, N. J., assignors to Merck & Co., Inc., Rahway, N. J., a corporation of New Jersey No Drawing. Application August 16, 1950, Serial No. 179,888

6 Claims. (Cl. 167—81)

This invention relates to new and improved procedures for the recovery of vitamin $B_{12}$ and other LLD and APF active substances from aqueous solutions containing the same, and particularly to procedures for effecting substantial purification and almost quantitative recovery of vitamin $B_{12}$ and other LLD and APF active substances by extracting aqueous solutions thereof with particular organic solvent mixtures.

Vitamin $B_{12}$ which has been prepared and is now commercially available in pure crystalline form has been demonstrated to have important therapeutic properties, and is particularly advantageous in the treatment of pernicious anemia. Various procedures have been disclosed in the literature for obtaining vitamin $B_{12}$ and other vitamin $B_{12}$-like substances having LLD and APF activity from liver concentrates and from fermentation broths obtained by the propagation of certain microorganisms such, for example, as strains of Streptomyces griseus. All of the procedures heretofore available for obtaining vitamin $B_{12}$ or other LLD and APF active substances from such starting materials have, however, involved a combination of extraction, adsorption, elusion and precipitation steps characterized by low recovery of active substances and considerable difficulty in the separation of active substances from associated impurities. The poor yields of active substances, coupled with the multiplicity of steps involved and the resulting high production cost, leave much to be desired in previously available procedures from the standpoint of commercial adaptability.

We have now discovered that yields of vitamin $B_{12}$ and other LLD and APF active substances can be increased several fold and the difficulties of removing associated impurities greatly reduced by use of extraction procedures wherein an aqueous solution containing vitamin $B_{12}$ and/or other LLD and APF active substances is extracted with a solvent consisting of a mixture of a chlorinated hydrocarbon containing 1 to 2 carbon atoms, such as carbon tetrachloride, ethylene dichloride or tetrachlorethane, and a substituted phenol. In general, mono alkyl substituted phenols such as o-, m-, and p-cresol, o-, m-, and p-isopropyl phenol, and o-amyl phenol, or mixtures thereof, are suitable substituted phenols for use in the new extraction procedures. In addition, certain halogen substituted phenols, such as 2,4,5-trichloro phenol and, to a lesser extent, mono aryl phenols such as p-phenyl phenol can be employed. On the other hand, highly alkylated phenols such as diamyl phenol, ditertiary butyl p-cresol, and ditertiary butyl m-cresol, and highly halogenated phenols such as pentachloro phenol are not suitable for use in the new extraction procedures. Substituted phenols considered preferable for use in the process, however, are o-, m-, and p-cresol and mixtures thereof.

Mixtures of chlorinated hydrocarbons and substituted phenols of the type above mentioned as the extracting solvent have the unique property of readily dissolving or extracting vitamin $B_{12}$ and related LLD and APF active substances, while at the same time rejecting most of the difficultly removable impurities normally associated therewith. It is significant to note that neither component of our solvent mixture is at all suited when used alone for extraction of vitamin $B_{12}$ or other LLD and APF active substances. Chlorinated hydrocarbons alone do not dissolve appreciable amounts of these substances; and substituted phenols, although dissolving and extracting the active substances, also dissolve and extract large amounts of the undesired impurities.

While the suitable substituted phenols abovementioned are generally compounds existing in liquid form, some of these compounds, such, for example, as p-phenyl phenol, 2,4,5-trichloro phenol and mixtures of m- and p-isopropyl phenol are solids at room temperature. These solid compounds, however, dissolve in the chlorinated hydrocarbons to form liquid solvent mixtures.

Our new extraction procedure can be employed at various stages in the recovery and purification of vitamin $B_{12}$ and other LLD and APF active substances and can, if desired, with suitable variation be employed two or more times in the overall isolation and purification procedure. A particular advantage is realized in employing our extraction procedure as the first step in recovery of vitamin $B_{12}$ and other LLD and APF active substances from a fermentation broth containing the same, since the use of our process eliminates at the very start of the overall isolation and purification procedure substantial amounts of the undesirable and difficultly removable impurities. At the same time, the amount of vitamin $B_{12}$ ultimately obtained when our process is employed in the initial treatment of fermentation broth is several times as great as that obtained by the best previously known method, i. e., a procedure involving treatment of broth with charcoal to adsorb the active substances and elution of active substances from charcoal with pyridine.

In carrying out our process using a carbon tetrachloride-cresol solvent mixture, the cresol can be in the form of a mixture of the ortho, meta and para isomers or can be one of the individual isomers. Generally, when employing the solvent mixture on a crude starting material such as a fermentation broth containing vitamin $B_{12}$ and other LLD and APF active substances, there is no great advantage in using an individual isomeric cresol rather than a commercial preparation containing the three isomers. However, when treating more purified concentrates containing vitamin $B_{12}$ or other LLD and APF active substances, it is preferable to employ a single cresol isomer such, for example, as purified o-cresol.

While the composition of the solvent mixture can be varied considerably depending upon the type of material to be treated and the particular result desired, the most practical mixture for treating a complex solution such as a fermentation broth contains 2 to 3 parts by volume of carbon tetrachloride for each part by volume of cresol. Solutions which are relatively free of impurities can be advantageously treated with solvent mixtures containing a smaller proportion of carbon tetrachloride; thus, for example, a 1:1 ratio can be employed for extractions with the carbon tetrachloride-cresol solvent mixture in advance stages of purification of vitamin $B_{12}$ and other LLD and APF active substances. When unusually complex mixtures containing very large amounts of impurities are treated, it is sometimes advantageous to employ larger amounts of carbon tetrachloride. This results in some lowering of the yield or recovery of vitamin $B_{12}$ or other LLD and APF active substances but maintains a high degree of purity in the recovered material, notwithstanding the complex nature of the starting material. If the ratio of carbon tetrachloride:cresol is increased as high as 6:1, most of the vitamin $B_{12}$ in the starting material is recovered relatively free of impurities, but the recovery of other LLD and APF active substances is considerably reduced.

At solvent ratios higher than 6:1, vitamin $B_{12}$ of slightly higher purity can be obtained, but repeated extractions are necessary to obtain good yields of vitamin $B_{12}$. Ratios above about 9:1 are not employed in extraction as the number of extractions required for good recovery becomes excessive. It is to be noted, however, that a ratio of about 13:1 or higher acts to transfer active materials quantitatively from the organic solvent mixture to the aqueous phase, and this factor is employed advantageously in separation of extracted vitamin $B_{12}$ and other LLD and APF active substances from the organic solvent mixture. Thus, for example, the solvent extract obtained by extracting an aqueous solution of active materials with a 2-3:1 carbon tetrachloride:cresol solvent can be mixed with a large excess of carbon tetrachloride to bring the ratio to about 13:1 or higher and then extracted with water to provide an aqueous solution of purified active materials.

The foregoing discussion of effect of changes of the solvent ratio, carbon tetrachloride-cresol, may be more readily understood from a consideration of the following table of distribution coefficients for the system at ratios ranging from 1–1:18–1 carbon tetrachloride:cresol.

*Distribution coefficients*

| Solvent Ratio $CCl_4$-Cresol (U. S. P.) | K |
| --- | --- |
| 1–1 | 0.0027 |
| 2–1 | 0.0027 |
| 3–1 | 0.0066 |
| 4–1 | 0.016 |
| 6–1 | 0.12 |
| 8–1 | 0.47 |
| 10–1 | 2.3 |
| 12–1 | 3.3 |
| 14–1 | 19 |
| 16–1 | 66 |
| 18–1 | 330 |

In the above table, K represents a fraction $C_w/C_s$ wherein $C_w$ is the concentration of vitamin $B_{12}$ in the water layer and $C_s$ is the concentration of vitamin $B_{12}$ in the solvent layer.

It will be understood that for solvent mixtures of other chlorinated hydrocarbons with other substituted phenols, tables of distribution coefficients similar to the one given above show a similar change in distribution coefficients with changes in the solvent ratio, although, of course, the numerical values of the distribution coefficients are characteristic for each particular solvent combination.

In order to maintain the desired control in our extraction procedures and particularly to regulate the carbon tetrachloride:cresol ratio in a particular operation which may involve extraction with several different portions of the solvent mixture, it is preferable to first add a calculated amount of cresol to the aqueous solution containing vitamin $B_{12}$ and other LLD and APF active substances so that the composition of the extracting solvent mixture is not altered when mixed with the aqueous solution to be extracted. This amount may readily be calculated from the distribution coefficient between water and carbon tetrachloride. It should also be noted that the amount of solvent mixture to employ with respect to the amount of aqueous solution to be extracted will vary considerably depending upon the particular nature of the aqueous solution. By way of illustration, with a complex aqueous solution such as a fermentation broth containing vitamin $B_{12}$ and other active substances as the starting solution, two extractions with one to two volumes of a 2-3:1 carbon tetrachloride:cresol mixture for each 10 volumes of broth appears to give optimum recovery, selectivity and overall efficiency in the process.

When extracting aqueous solutions containing relatively higher concentrations of vitamin $B_{12}$ and $B_{12}$-like substances, and relatively lower concentrations of undesirable impurities, such as aqueous solutions obtained in advanced stages in the overall purification procedure, good results are obtained using larger ratios of the solvent mixture to aqueous solution as, for example, one part of solvent mixture to 1–5 parts by volume of the aqueous solution of active substances.

As a further adaptation of our invention which is particularly useful in treating solutions containing vitamin $B_{12}$ and other LLD and APF active substances in a form substantially free of impurities, the extraction with carbon tetrachloride-cresol solvent can be carried out in a continuous or semi-continuous manner as a countercurrent extraction or distribution between the solvent and aqueous phase. The countercurrent extraction or distribution can be effected in a suitable continuous apparatus or batchwise by employing a number of separate vessels containing one phase which is successively extracted with a number of portions of the opposite phase. In the countercurrent extraction or distribution procedure, it is also preferable to saturate each phase with the opposite phase in order to control the composition of the extracting solvent mixture, and in the countercurrent extraction or distribution procedure, it is distinctly advantageous to employ a single cresol isomer, such as o-cresol.

The countercurrent extraction or distribution procedure effects not only a separation of the remaining impurities, but with a proper selection of solvent ratios, can also be employed as a practical means for separating vitamin $B_{12}$ from associated LLD and APF active substances. Crude preparations of vitamin $B_{12}$, particularly as obtained from fermentation products such as a *Streptomyces griseus* fermentation broth, contain considerable amounts of a substance having LLD and APF activity which is very closely related to vitamin $B_{12}$.

The conditions required to effect separation of vitamin $B_{12}$ from associated LLD and APF active material other than vitamin $B_{12}$ by countercurrent distribution will, of course, vary somewhat with the selection of solvents employed in the organic solvent phase. By way of illustration, however, it should be noted that with an organic solvent phase consisting of carbon tetrachloride and o-cresol, a solvent ratio of about five parts of carbon tetrachloride to two parts of o-cresol shows a distribution coefficient $C_w/C_s$ ($C_w$=concentration in the aqueous phase; $C_s$=concentration in the solvent phase) of almost zero (substantially all of the vitamin $B_{12}$ passes to the solvent phase). At this same solvent ratio, however, the distribution coefficient for the associated LLD and APF active material appears to be approximately 0.20. This marked difference in distribution coefficients makes possible the separation and recovery of substantially pure vitamin $B_{12}$ and a purified fraction of LLD and APF active material other than vitamin $B_{12}$ from mixtures thereof.

In employing the countercurrent distribution procedure for recovering LLD and APF active material other than vitamin $B_{12}$ directly from crude mixtures containing LLD and APF active substances, such, for example, as *Streptomyces griseus* fermentation broth, it may be necessary to repeat the countercurrent distribution procedure two or more times. Thus, for example, a countercurrent distribution may preferably be carried out in a system of six or more plates or extraction stages (seven or more vessels), and when a seven plate system is employed (eight vessels numbered zero to seven) with the solvent phase stationary, substantially all of the vitamin $B_{12}$ remains in the organic solvent phase in vessel No. 0, whereas the bulk of the LLD and APF active material (other than vitamin $B_{12}$) is carried to intermediate extraction stages and is contained in vessels 3, 4 and 5, impurities predominating in the remaining vessels. In vessels 3, 4 and 5, however, there will also be substantial amounts of impurities if the starting material is a crude mixture of LLD and APF active substances. A second countercurrent distribution of active material recovered from vessels 3, 4 and 5 will enable recovery of a fraction of LLD and APF active material other than vitamin $B_{12}$ essentially free of associated impurities.

It will be apparent, of course, that the ease and effectiveness of carrying out the countercurrent distribution procedure above-described depends directly on the concentration and relative purity of the starting LLD and APF active material. One highly purified form of starting material is a crystalline complex of vitamin $B_{12}$ and vitamin $B_{12}$-like material which is obtained from a *S. griseus* fermentation broth by a procedure disclosed and claimed in the copending application of Briggs, Denkewalter and Hughey, Serial No. 132,804, filed December 13, 1949. Briefly this procedure comprises adsorbing vitamin $B_{12}$ and other vitamin $B_{12}$-like material having LLD and APF activity on charcoal, eluting the active substances from the charcoal with a two phase solvent consisting of water and an organic polar liquid which is not completely miscible with water, as, for example, benzyl alcohol or an alkyl alcohol containing at least four carbon atoms, transferring the active substances from the aqueous phase of the eluate to an organic solvent suitable for chromatography, as, for example, benzyl alcohol, and subjecting the active substances to at least one chromatographic purification on a column of alumina, adding to the solution of active substances obtained after chromatographing a miscible organic solvent which is a non-solvent for said active substances, such, for example, as acetone and ether, to precipitate the active substances, transferring the active substances to an aqueous medium and crystallizing from the aqueous medium the complex of vitamin $B_{12}$ and other LLD and APF active material.

A still further adaptation of our invention which can be employed at various stages of the purification of vitamin $B_{12}$ and other LLD and APF active materials, but which is particularly advantageous when employed in early stages of the purification involves first extracting a crude aqueous solution of active materials with about 5:2 carbon tetrachloride:cresol, thereby transferring substantially all of the active materials to the solvent mixture. By separating the solvent layer, adding approximately an equivalent amount of water, and then adding enough carbon tetrachloride to raise the solvent ratio to about 6:1, the vitamin $B_{12}$ is retained in the solvent phase while the other LLD and APF active material is transferred to the aqueous phase from which it can be recovered by precipitation with acetone. Vitamin $B_{12}$ can, in turn, be recovered from the solvent layer by adding a small amount of water and enough carbon tetrachloride to raise the solvent ratio to about 13–15:1. This forces the vitamin $B_{12}$ into the aqueous layer from which it can be recovered by precipitation with acetone.

The vitamin $B_{12}$ thus obtained, or vitamin $B_{12}$ obtained employing other procedures, can be further purified, if desired, by countercurrent distribution between carbon tetrachloride, cresol and water in the same fashion as that described above for the purification of the fraction of other LLD and APF active material. For the purification of vitamin $B_{12}$, it is, however, necessary to employ a higher ratio of carbon tetrachloride to cresol, due to the higher solubility of vitamin $B_{12}$ in the solvent mixture. Thus, for example, with aqueous phase stationary a carbon tetrachloride:cresol (U. S. P.) ratio of about 9:1 will distribute the bulk of the vitamin $B_{12}$ in vessels 2, 3, 4 and 5 in a system of eight vessels numbered 0 to 7. (The particular extraction stage, or stages to which the vitamin $B_{12}$ is carried will, of course, depend on the particular solvent ratio employed.) Addition of carbon tetrachloride to the contents of vessels 2, 3, 4 and 5 to provide a solvent ratio in excess of about 15:1 transfers the vitamin $B_{12}$ to the aqueous phase from which vitamin $B_{12}$ can be recovered by precipitation with acetone, followed by crystallization from water-acetone.

The following examples will serve to show how procedures in the present invention can be carried out, but it is to be understood that they are given by way of illustration and not of limitation.

Example 1

Fermentation broth obtained from the propagation of a strain of *S. griseus* producing LLD active substances was acidified to about pH 2.5 (to remove active substances from the cells) and given a preliminary clarification treatment by adding a small amount of diatomaceous silica and filtering. The acid filtrate was then neutralized to about pH 7.5 and refiltered with a small amount of diatomaceous silica as filter-aid. Four liters of the resulting filtrate was extracted twice with 400 ml. of a 3:1 carbon tetrachloride-cresol mixture. (The cresol was a mixture of the isomers.) To the combined extracts were added 80 ml. of water and 2 l. of carbon tetrachloride, and the water layer was separated. The organic layer was extracted with 80 ml. of water, and the water layers were combined. The aqueous solution was saturated with ammonium sulfate and then extracted successively with 20 ml. and 5 ml. portions of benzyl alcohol. To the combined benzyl alcohol extracts were added 150 ml. of ether, and a flocculent precipitate formed and was removed. The precipitate was dissolved in about 2 ml. of methanol, and the solution was chromatographed on a $\frac{5}{16}''$ x $3\frac{1}{2}''$ column containing 5.3 gms. of activated alumina. The column immediately developed a bright pink band which was washed down the column with methanol as the eluant. The effluent containing pink coloration, 10.5 ml., was collected as rich cut. The rich cut was assayed for vitamin $B_{12}$ and vitamin $B_{12}$-like materials by measurement of the optical density at 5500 Å, a characteristic absorption maximum for vitamin $B_{12}$. The result when compared with the value for pure vitamin $B_{12}$ indicated the presence of the equivalent of 0.315 mg. of vitamin $B_{12}$.

Example 2

To a 3.5 l. portion of the neutral filtrate (as employed in Example 1) was added 0.818 mg. of pure vitamin $B_{12}$, and the solution was processed in the same manner as described in Example 1. The rich effluent from chromatography when assayed was found to contain the equivalent of 0.945 mg. of vitamin $B_{12}$. Assuming the same recovery of the active material originally present in the broth, the recovery of the added vitamin $B_{12}$ was 82%. This recovery can be increased without materially affecting the purity by adding to the aqueous phase, prior to extraction, an amount of cresol sufficient to place the aqueous phase in equilibrium with the solvent phase, i. e., so that the amount of cresol in the solvent phase is not altered when the two phases are brought together. Also, one or more additional extractions will result in increased recovery.

Example 3

Fermentation broth obtained from the propagation of a strain of *S. griseus* producing LLD active substances was acidified, filtered with the aid of diatomaceous silica, neutralized and refiltered as described in Example 1. The filtered broth was assayed for LLD activity. 270 gallons of the filtered broth was extracted twice with 26 gallons of a mixture of 1 volume of mixed cresols and 3 volumes of carbon tetrachloride. The solvent extracts were combined, and 170 gals. of carbon tetrachloride was added. This mixture was extracted successively with 10 gals. and 5 gals. of water, and the water extracts were combined and assayed for LLD activity. Both the filtered broth and the water extracts were found to contain a total of $2.7 \times 10^9$ units of LLD activity indicating a quantitative removal of active substances within the error of the assay.

4,350 gallons of the filtered broth was agitated with 162 lbs. of activated charcoal. The charcoal adsorbate was eluted by slurrying with a solution consisting of 45 gallons of a mixture of $\alpha$, $\beta$, and $\gamma$ picolines and 100 gallons of water. The charcoal was again slurried with 68 gallons of a solution of the same composition. The eluates were combined and concentrated at 35° C. in vacuo to a volume of 24 liters. The concentrate was assayed and found to contain $23.3 \times 10^9$ units of LLD activity, equivalent to $1.45 \times 10^9$ per 270 gallons of filtered broth. Thus, only one-half of the activity was recovered by this old procedure, as compared to complete recovery using the new procedure.

Example 4

Aqueous and solvent phases for countercurrent distribution were prepared by mixing 2 parts by volume of o-cresol, 5 parts by volume of carbon tetrachloride, and 7 parts by volume of water. The mixture was shaken and allowed to separate into two phases. Equivalent portions, i. e., 10 ml. each, of solvent phase were placed in eight vessels numbered 0 to 7.

About 147 mg. of a crystalline complex of vitamin $B_{12}$ and other LLD and APF active material, estimated to contain about 32% of vitamin $B_{12}$, was dissolved in 10 ml. of the aqueous phase, and the resulting solution was then added to vessel No. 0. After agitation, the aqueous layer was separated and transferred to vessel No. 1, an additional 10 ml. portion of the aqueous phase being added to vessel No. 0. The two vessels were then agitated and the aqueous layers were separated and transferred from vessel 1 to 2 and from vessel 0 to 1, and 10 ml. of the aqueous phase was again added to vessel No. 0. This procedure was repeated until all eight vessels contained a water layer in equilibrium with the organic solvent layer.

About 150 ml. of carbon tetrachloride was then added to the contents of each vessel to transfer active material to the aqueous layer, and the aqueous layers were separated and each extracted with ether to remove impurities and then evaporated to dryness in vacuo. About 100 micrograms of each of the residues was then dissolved in 3 ml. of water and subjected to tests to ascertain the absorption spectrum of each. The residue, 23 mg., from vessel No. 0, showed maxima at 2780 Å, 3610 Å and 5500 Å characteristic of vitamin $B_{12}$. Residues from vessels Nos. 2, 3 and 4 each showed maxima at 2750 Å, 3520 Å and 5300 Å.

The residues from vessels 2, 3 and 4 were each crystallized in 1 to 2 ml. of water by the addition of acetone. The combined crystalline material was dissolved in 10 ml. of water saturated with the carbon tetrachloride:o-cresol solvent mixture and again subjected to countercurrent distribution as above-described using a nine plate system (10 vessels numbered 0 to 9). Products obtained from vessels 4–8 showed absorption maxima at 2750 Å, 3520 Å and 5300 Å, and the products from these vessels were combined as before and subjected to a third countercurrent distribution using a six plate system. After recrystallization from water-acetone, the products from vessels 2, 3, 4 and 5 showed absorption maxima at 2750 Å, 3520 Å and 5300 Å and were combined to yield 28.5 mg. of highly purified LLD and APF active material other than vitamin $B_{12}$.

(It has since been determined as more fully disclosed and claimed in a copending application of our colleagues Kaczka, Wolf and Folkers, Serial No. 174,999, filed July 20, 1950, now abandoned, that the carbon tetrachloride employed furnishes sufficient chloride ion to convert the LLD and APF active material other than vitamin $B_{12}$ to a chloride analog of vitamin $B_{12}$ of about 98% purity.)

*Example 5*

One volume of U. S. P. cresol, 9 volumes of carbon tetrachloride, and 10 volumes of water were mixed, shaken vigorously, and allowed to settle. The two phases were separated and stored for use in the following countercurrent distribution.

Five ml. portions of the water phase were placed in eight vessels numbered 0 to 7. 2.79 mg. of crystalline material high in vitamin $B_{12}$ content was dissolved in the water of vessel No. 0. To this vessel was added 5 ml. of the solvent phase, the vessel was agitated, and the solvent layer was separated and transferred to vessel No. 1. An additional 5 ml. of solvent was added to vessel No. 0. The two vessels were then agitated, and the solvent layers were separated and transferred from vessel 1 to 2 and from vessel 0 to 1. Five ml. of solvent was again added to vessel No. 0. This procedure was repeated until all eight vessels contained a water layer in equilibrium with a solvent layer.

To the combined contents of vessels 3 and 4 was added 20 ml. of carbon tetrachloride to transfer active material to the aqueous layer. This aqueous layer was separated and subjected to a second 7-plate countercurrent distribution in the manner described above, employing 10 ml. portions of each phase. The optical densities of both layers of each vessel were measured at 5500 Å. The distribution coefficients, concentration in water layer÷concentration in solvent layer=$K$, calculated from the optical density readings were between 1.1 and 1.2 for the materials in vessels 1 through 6. The contents of these vessels when combined, treated with excess carbon tetrachloride to transfer the active substances to the water layer, precipitated with excess acetone, and crystallized from water-acetone yield crystalline vitamin $B_{12}$ over 95% pure.

Various changes and modifications in the foregoing procedure will occur to those versed in the art, and to the extent that such changes and modifications fall within the purview of the appended claims, it will be understood that they constitute part of our invention.

We claim:

1. The process that comprises extracting an aqueous solution containing LLD and APF active substances with an organic solvent comprising a mixture of carbon tetrachloride and cresol in the proportion of about 1–3:1 parts by volume thereby effecting a separation of an organic solvent solution of the LLD and APF active substances from an aqueous solution of impurities, and recovering the LLD and APF active substances from said organic solvent solution.

2. The process as defined in claim 1 wherein the cresol is present as a mixture of isomeric cresols.

3. The process as defined in claim 1 wherein the starting aqueous solution is a fermentation broth obtained by the propagation of a strain of the organism *Streptomyces griseus*, and the fermentation broth and organic solvent mixture are employed in proportions of approximately 10:1 by volume.

4. The process that comprises extracting an aqueous solution containing vitamin $B_{12}$ and other LLD and APF active material with an organic solvent mixture of carbon tetrachloride and cresol in the proportion of about 1–3:1 by volume thereby effecting a separation of an organic solvent solution of vitamin $B_{12}$ and other LLD and APF active material from an aqueous solution of impurities, removing the organic solvent phase from the system and combining the same with approximately an equivalent amount of water, and adding thereto additional carbon tetrachloride raising the solvent ratio to at least 6:1 to effect a transfer of active material from the organic solvent phase to the aqueous phase.

5. The process as defined in claim 4 wherein carbon tetrachloride is added in an amount to raise the solvent ratio to about 13–15:1 parts by volume thereby transferring any vitamin $B_{12}$ and other LLD and APF active material present in the system to the aqueous phase.

6. The process as defined in claim 4 wherein carbon tetrachloride is added in an amount to raise the solvent ratio to about 6:1 parts by volume thereby effecting a separation of an organic solvent solution containing vitamin $B_{12}$ from an aqueous solution containing other LLD and APF active material, and vitamin $B_{12}$ is recovered from said organic solvent solution.

References Cited in the file of this patent

UNITED STATES PATENTS

| Number | Name | Date |
|---|---|---|
| 2,134,256 | Laland | Oct. 25, 1938 |
| 2,530,416 | Wolf | Nov. 21, 1950 |
| 2,563,794 | Rickes | Aug. 7, 1951 |

OTHER REFERENCES

Smith, Proceedings of the Biochemical Society in Biochemical Journal, vol. 43, No. 1 (October 1948), pages viii, ix.